(12) United States Patent
Andres

(10) Patent No.: US 11,925,135 B2
(45) Date of Patent: Mar. 12, 2024

(54) SEEDING ELEMENT COMPRISING AN ADJUSTABLE PRESS MEMBER AND CORRESPONDING SOWING MACHINE

(71) Applicant: KUHN SAS, Saverne (FR)

(72) Inventor: Christophe Andres, Waldolwisheim (FR)

(73) Assignee: KUHN SAS, Saverne (FR)

( * ) Notice: Subject to any disclaimer, the term of this patent is extended or adjusted under 35 U.S.C. 154(b) by 863 days.

(21) Appl. No.: 16/975,209

(22) PCT Filed: Mar. 6, 2019

(86) PCT No.: PCT/EP2019/055580
§ 371 (c)(1),
(2) Date: Aug. 24, 2020

(87) PCT Pub. No.: WO2019/170753
PCT Pub. Date: Sep. 12, 2019

(65) Prior Publication Data
US 2020/0404836 A1 Dec. 31, 2020

(30) Foreign Application Priority Data
Mar. 9, 2018 (FR) ..................................... 18 52063

(51) Int. Cl.
*A01C 5/06* (2006.01)
(52) U.S. Cl.
CPC .............. *A01C 5/066* (2013.01); *A01C 5/064* (2013.01)
(58) Field of Classification Search
CPC ........... A01C 5/066; A01C 5/064; A01C 5/00; A01C 5/06; A01C 5/068
See application file for complete search history.

(56) References Cited

U.S. PATENT DOCUMENTS

2011/0120357 A1* 5/2011 Schilling ................ A01C 5/064
111/163
2015/0351313 A1* 12/2015 Dienst .................... A01C 7/102
172/668
(Continued)

FOREIGN PATENT DOCUMENTS

DE 10 2007 027 089 A1 12/2008
DE 10 2008 008 553 A1 8/2009
(Continued)

OTHER PUBLICATIONS

International Search Report dated Apr. 5, 2019 in PCT/EP2019/055580 filed on Mar. 6, 2019, 2 pages.

*Primary Examiner* — Jamie L McGowan
(74) *Attorney, Agent, or Firm* — Oblon, McClelland, Maier & Neustadt, L.L.P.

(57) ABSTRACT

A seeder element of an agricultural machine includes a seed distribution element and a tamping device. The tamping device is arranged behind an outlet of the seed distribution element in a direction of advance at work of the seeder element. The tamping device includes an adjustment device and a tamping element. The tamping element exerts a tamping force on the ground in at least one work position of the adjustment device. The at least one work position of the adjustment device is a load-relieving position in which the adjustment device exerts, on the tamping element, a load-relieving stress that counters the weight of the tamping element.

11 Claims, 3 Drawing Sheets

(56) References Cited

U.S. PATENT DOCUMENTS

2017/0367250 A1    12/2017  Hagny et al.
2018/0249621 A1     9/2018  Horsch
2018/0279538 A1    10/2018  Hagny et al.
2019/0297772 A1*   10/2019  Andres ................ A01C 7/205

FOREIGN PATENT DOCUMENTS

DE   10 2015 114 362 A1   3/2017
FR        2 788 657 A1    7/2000

* cited by examiner

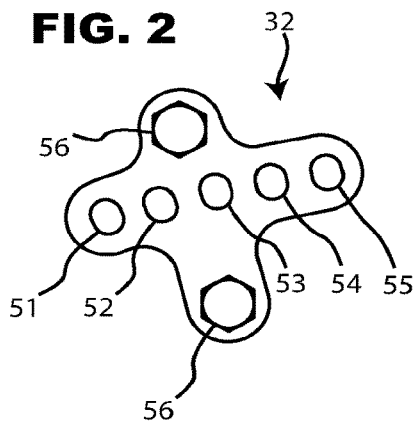
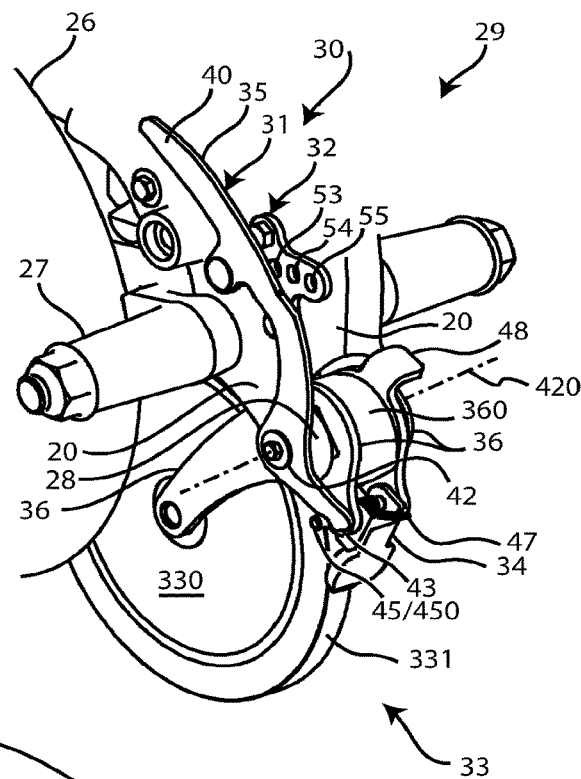
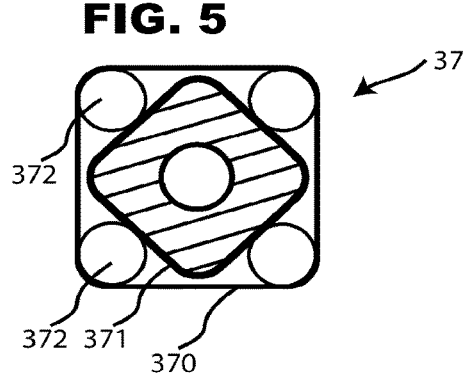
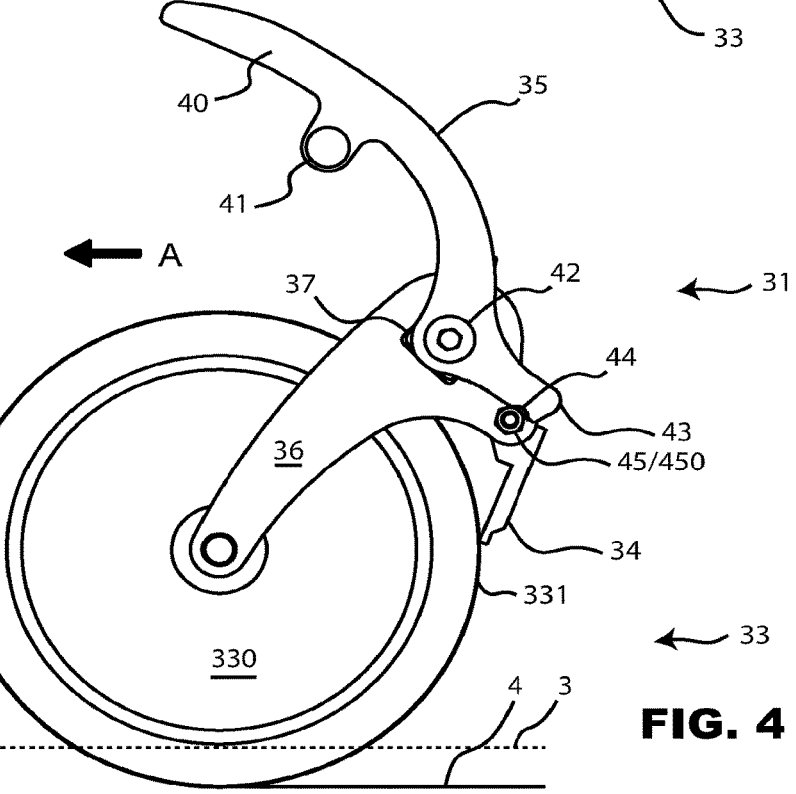

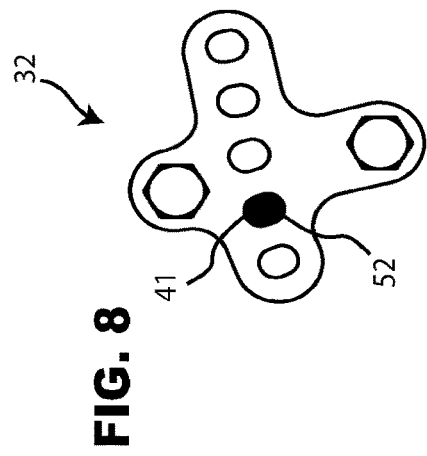
FIG. 8
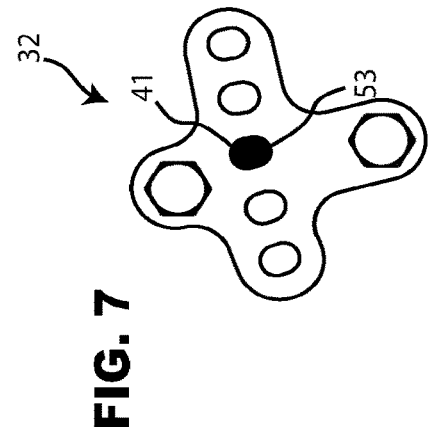
FIG. 7
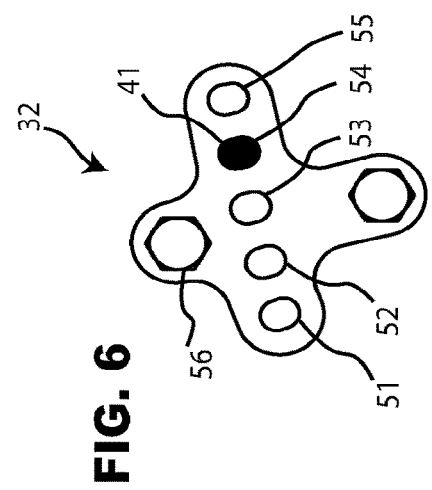
FIG. 6
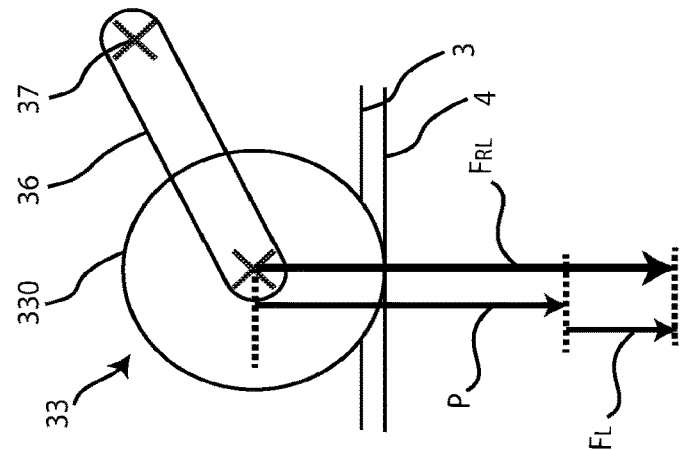
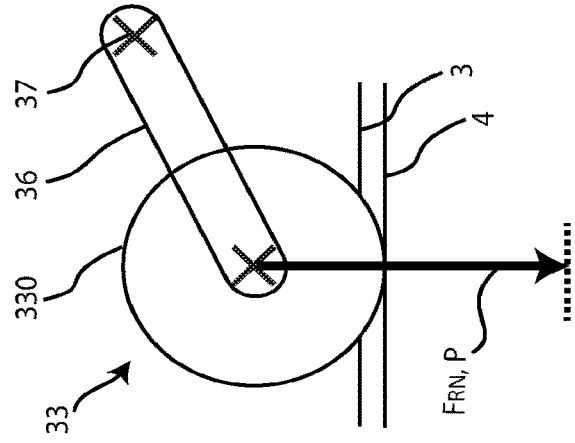
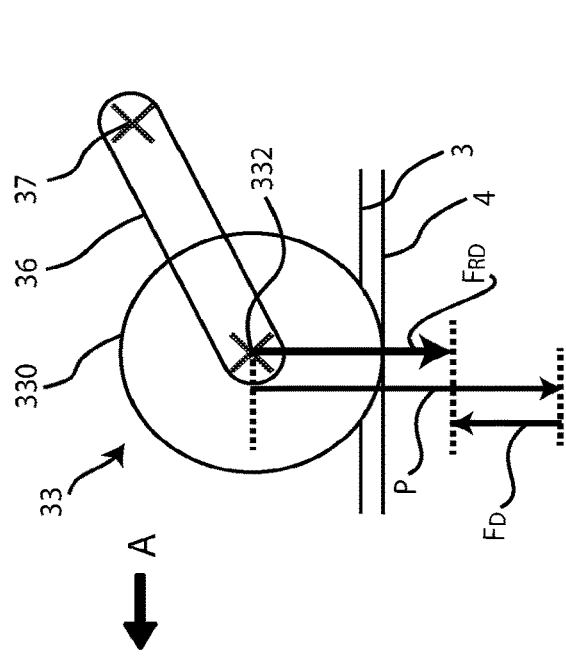

SEEDING ELEMENT COMPRISING AN ADJUSTABLE PRESS MEMBER AND CORRESPONDING SOWING MACHINE

BACKGROUND

The present invention relates to the general technical field of agricultural machinery and in particular the field of sowing.

The invention concerns a seeder element of a sowing machine, and in particular a seeder element, such as a precision seeder element, comprising a seed tamping device designed to improve the contact between the seed and the soil immediately after sowing to ensure proper germination.

The patent application EP3008987A1 shows a tamping wheel retraction system implementing a lever having a cam with two stable positions and allowing the tamping wheel to reach an extended work position, and a retracted position.

The patent application US2008/0184920A1 discloses, in FIGS. 2 and 5, a tamping force adjusting system for a tamping wheel. This adjustment system comprises a perforated rod that can be adjusted according to different height positions. A pivoting arm carrying the tamping wheel is mounted on a support common to different tools. More specifically, the tamping wheel is mounted on a first end of the pivoting arm. The perforated rod is connected via a tension spring on a second end of the pivoting arm, opposite the first end. The action of the tension spring pushes the tamping wheel against the ground by leverage. The spring acts on the pivoting aim and a removable pin makes it possible to keep the rod vertical in a chosen position against the common support, and thus control the tamping force.

Other configurations exist in which it is necessary to remove and then refit certain parts, such as a screw and nut pair, to fix the tamping wheel in the desired position.

In the known solutions, the tamping device is not used when the soil is too loose, to avoid pressing the seed too deeply into the ground. Similarly, when the soil is sticky in wet conditions and the soil and seeds stick to the tamping element, the seeds are sown irregularly or are not sown where they should be. This has a direct impact on the yield of the harvest. The usual practice is therefore not to use the tamping element, by either retracting it or removing it, which can entail a significant disassembly time for each row and the use of tools for disassembly. Nevertheless, leaving the seeds without tamping also has an impact on the yield since the contact between the seeds and the soil is not ensured and their moisture supply is lower during germination.

BRIEF SUMMARY

The object of the invention is to propose a seeder element for agricultural machines comprising a simplified and improved variant of the adjustment system of a tool such as the tamping wheel, allowing said tool to be adjusted without disassembly. The invention also relates to a seeder comprising such a seeder element.

The invention therefore relates to a seeder element for agricultural machines, the seeder element comprising a seed distribution element and a tamping device, the tamping device being positioned behind an outlet of the seed distribution element in a direction of advance at work of the seeder element, the tamping device comprising an adjustment device and a tamping element, the tamping element being configured to exert a tamping force in the bottom of the furrow in at least one work position of the adjustment device. According to the invention, the at least one work position of the adjustment device is a load-relieving position in which the adjustment device exerts, on the tamping element, a load-relieving stress that counters the weight of the tamping element.

The seeder element with the tamping device described above therefore has at least one load-relieving position of the tamping element, in which the tamping force exerted on the bottom of the furrow and resulting from relieving the load is less than the weight of the tamping element alone. This is particularly advantageous when seeds need to be tamped to promote the seeds' contact with the soil and optimise their germination. In fact, with the known solutions, in the standard tamping position in which the tamping stress on the bottom of the furrow results from the weight of the tamping element alone, a high soil moisture content can cause the earth and seeds to stick to the tamping element. In this situation, the planting of the seeds is poor or even incorrect, and the yield declines. The tamping element can therefore be used in conditions that would make it impossible or difficult to use the known tamping elements.

In other words, the adjustment device makes it possible, in at least one of its work positions, to relieve the tamping element of a portion of its weight so as to limit the tamping stress in accordance with the seeding conditions, in particular the soil quality (humidity, composition, sticky or not, loose or not). The versatility of the tamping device is improved as a result.

Advantageously, the adjustment device comprises a flexible connecting element which exerts the load-relieving stress on the tamping element in the load-relieving position.

The application of a load-relieving stress on the tamping element, here comprising the tamping wheel, is achieved simply, thanks to the flexible connecting element.

Advantageously, the adjustment device comprises a handling arm, the position of the handling arm determining the load-relieving stress that the flexible connecting element exerts on the tamping element in the load-relieving position.

Thanks to the handling arm, adjusting the tamping element takes place in a simple manner and does neither require a tool separate from the seeder element, nor a disassembly of parts.

In this position, the tamping wheel is load-relieved by means of the flexible connecting element without complexity of implementation.

Advantageously, the adjustment device accepts several work positions, one of them being said load-relieving position. The other work positions can comprise a neutral tamping position (supplying no force other than the weight of the tamping element) and/or at least one reinforced tamping position.

The adjustment range obtained is therefore especially advantageous.

The invention also relates to a seeder comprising a seeder element as described above.

BRIEF DESCRIPTION OF THE DRAWINGS

Other features and advantages of the invention will become apparent from the non-exhaustive example embodiments of the invention below and the attached drawings, in which:

FIG. 2 shows a positioning element for the tamping adjustment device of FIG. 1;

FIG. 3 shows, in a perspective view, the tamping device of FIG. 1;

FIG. 4 is a detailed view of the tamping wheel equipped with another portion of the tamping adjustment device;

FIG. 5 shows a flexible connecting element of the tamping adjustment device of FIG. 1;

FIGS. 6 to 8 illustrate diagrammatically three work positions—a load-relieving position, a neutral tamping position and a reinforced tamping position—which the components of the tamping device of FIG. 1 can take.

DETAILED DESCRIPTION

Figure 1:
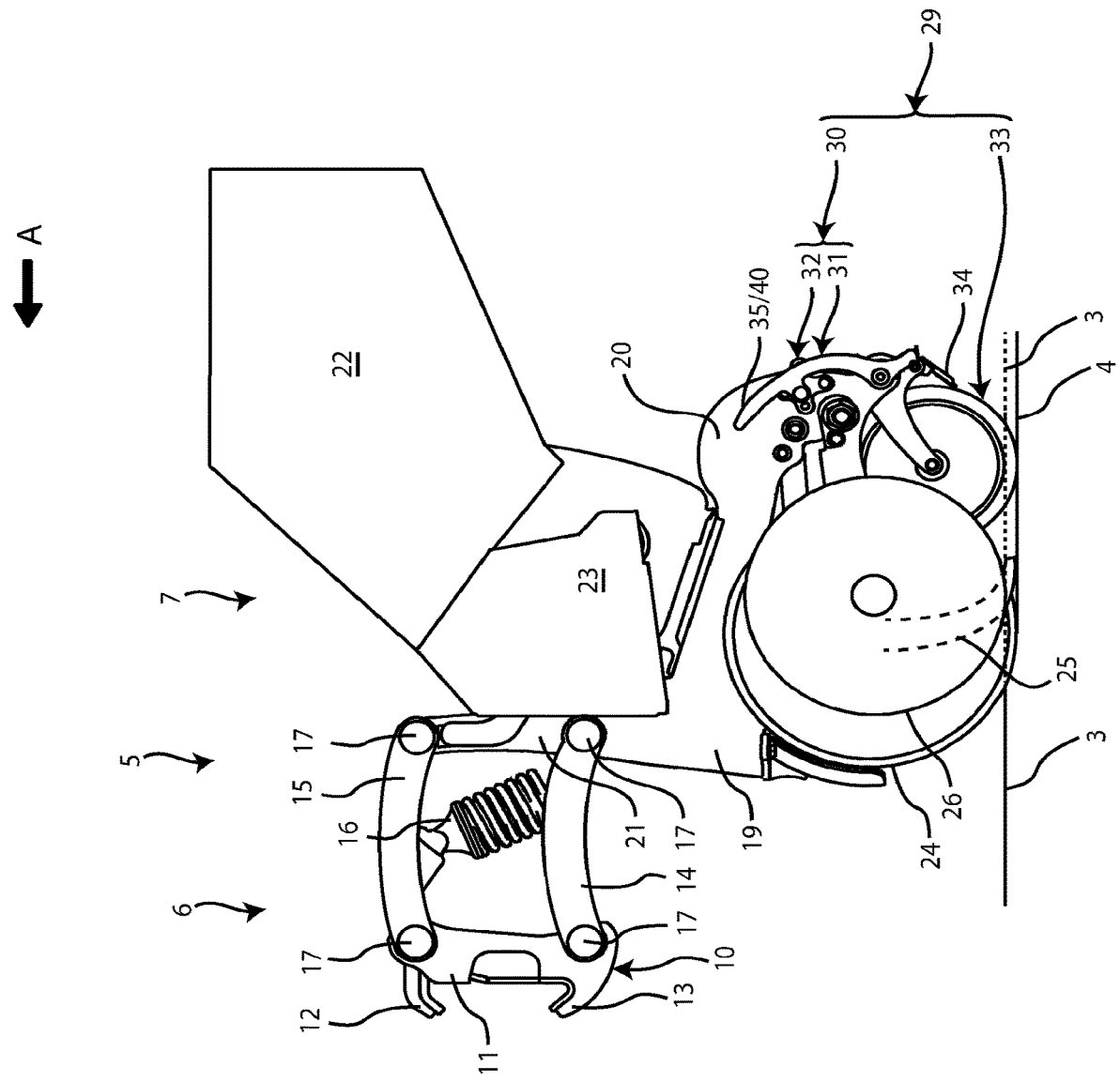
FIG. 1 is a side view of a seeder element with a tamping device and a tamping adjustment device according to the invention.

FIG. 1 shows a precision-seeder type of seeder element 5, designed to be mounted on a single seeder chassis, not shown. At work, the seeder element 5 is designed to move along the ground 3 in a direction of advance at work A which is also the longitudinal orientation of the seeder element 5. In the following, the terms "front" and "rear", "upper" and "lower" are relative to the general direction A. The terms "stress" and "force" are in this case used as synonyms.

The seeder element 5 has a deformable mechanism 6 and a seeder unit 7.

The deformable mechanism 6 comprises in its front portion a hitching system 10 designed to be mounted on a seeder chassis, not shown.

The hitching system 10 has a front post 11, preferably substantially vertical as shown, a lower hook 13 and an upper hook 12. The lower hook 13 and the front post 11 here form a single piece. The upper hook 12 is here, non-restrictively, adjustable relative to the lower hook 13.

The deformable mechanism 6 also comprises two arms 14 and 15, each connected by a respective pivot pin 17 at the front to the front post 11 and at the rear to an upper portion 21 of a chassis 19 of the seeder unit 7. In the seeder element 5, the two arms 14 and 15 are shaped substantially parallel to each other so as to define a deformable parallelogram having the pivot pins 17 for vertices. In this way, the deformable mechanism 6 is able to follow the contours of the ground 3 during work.

An adjustment element 16, here comprising a compression spring, is mounted on each of the arms 14 and 15 to allow the ground pressure of the seeder element 5 to be adjusted.

The seeder unit 7 here comprises in particular the chassis 19, a hopper 22, a seed distribution element 23, two furrow opening discs 24, a drop tube 25 (optional), two gauge wheels 26, and a tamping device 29 (FIG. 1).

The chassis 19 is here substantially L-shaped. The chassis 19 here comprises an upper leg 21, at the front of the chassis 19. The upper leg 21 forms a rear support for the arms 14 and 15 of the deformable mechanism 6. The chassis 19 also comprises a rear portion 20 forming a support for various elements in contact with the soil (the furrow opening discs 24, the drop tube 25, the two gauge wheels 26) and for the tamping device 29. Supports 27 connect the rear portion 20 to the gauge wheels 26.

The role of the furrow opening discs 24 is to form the furrow 4 so that the drop tube 25 can deposit the seeds in it.

In a variant, the seeder unit 7 comprises a single furrow opening disc 24 at the rear of which the drop tube 25 extends, here directly behind the rotation axis of the disc.

The drop tube 25 here forms the outlet element of the seed distribution element 23 and guides the seed into the bottom of the furrow 4.

The tamping device 29 comprises an adjustment device 30 and a tamping element 33.

The tamping device 29 is positioned behind the drop tube 25 and in the alignment of the drop tube 25 in a direction of advance at work of the seeder element 5. This arrangement allows to block the seeds as soon as they exit from the drop tube 25 and prevents them from rebounding in the furrow 4, which is favourable to the sowing regularity and the yield. The purpose of the tamping device 29 is to ensure the seed's contact with the soil and to promote germination.

In a variant not shown, the seed distribution element 23 is in a low position, i.e. horizontally at the height of the rotation axes of the furrow opening discs 24. Therefore, there is no drop tube 25 provided. The seed distribution element 23 can thus be positioned between the furrow opening discs 24 and the tamping element 33.

The tamping element 33 here comprises a tamping wheel 330 and two wheel arms 36. The tamping wheel 330 here preferably has a rolling surface 331, or outer ring, made of stainless steel. In a variant, the rolling surface is made of elastomer or of another metal or material. The tamping wheel 330 moves on the bottom of the furrow 4 and its purpose is to ensure contact between the seed and the soil. The tamping wheel 330 is also called press roller.

The wheel arms 36 are pivotably mounted on the rear portion 20 of the chassis 19 via a pivot pin 42 of axis 420. The tamping wheel 330 is pivotably mounted between the wheel arms 36, here at their farthest distal end 361 from the pivot pin 42.

Here, the wheel arms 36 are mounted on two lugs 28 of the rear portion 20. These two lugs 28 extend in a projection towards the bottom and rear of the chassis 19. The wheel arms 36 here extend to the front of the seeder element 5 such that the tamping wheel 330 is pushed. Here, a spacer 360 keeps the two wheel arms 36 at a set distance from each other and in position relative to the lugs 28. In a variant not shown, a single wheel aim can be provided. A spacer with a suitable length for the desired gap with the single wheel arm can be provided to keep the single wheel arm in position relative to the rear portion 20.

An axis 450 extends between the proximal ends 362 of the wheel anus 36 opposite the distal end 361. A torsion spring 47 and a scraper 34 are aligned along the axis 450, between the wheel arms 36. The torsion spring 47 forces the scraper 34 against the rolling surface 331 of the wheel to detach the soil and residues that may have stuck to it.

A first wheel arm 36 has a retraction stop 45 on its proximal end 362, i.e. opposite the front end on which the tamping wheel 330 is mounted here relative to the pivot pin 42. As will be explained below, the retraction stop 45 is designed to allow the tamping wheel 330 to be retracted. The retraction stop 45 here is a protrusion from the arm 36. The retraction stop 45 is preferably placed on a portion of the axis 450 extending outwards from the first arm 36 (FIG. 3). In this case, the stop 45 is the end of a screw shaft (FIG. 4). In variants not shown, the retraction stop can be a prolongation of the axis 450. The stop 45 can also be a separate element from the axis 450, such as a metal rod or another rigid element. The stop 45 can therefore for example be unaligned with the axis 450, or be made in one piece with one of the wheel arms 36.

The second wheel arm 36 here has a stop 48, called lower stop, positioned to limit the downward travel of the tamping element 33 during the raising of the seeder element 5 and therefore of the machine. Here, the stop 48 takes the form of a fold in the wheel arm 36 opposite the pivot pin 42. The stop 48 is designed to come into contact with the rear portion 20 of the chassis 19 on raising.

The adjustment device 30 comprises an adjustment element 31 (FIG. 4) and a first positioning element 32 (FIG. 2).

The adjustment element 31 comprises a handling arm 35 and a flexible connecting element 37 (FIG. 4). In the embodiment illustrated in FIGS. 4 and 5, the flexible connecting element 37 is of the elastomer cylinder type. The flexible connecting element 37 therefore has a shell 370, for example having a square cross-section or a square cross-section with rounded corners, aligned along the axis 420. An inner pin 371 is positioned in the shell 370. Elastomer cylinders 372, for example four, are inserted between the shell 370 and the inner pin 371. To keep the inner pin 371 in position between the lugs 28, the inner pin 371 can be fixed on a threaded rod, not shown. The flexible connecting element 37 described above and illustrated in cross-section in FIG. 5 is called a torque tube in the present description.

The wheel arms 36 and the spacer 360 are mounted on the shell. The inner pin is pivotably mounted relative to the chassis 19 and forms the axis reference 420 of the pivot pin 42.

The handling arm 35 here has a handle 40 on an upper end and a lug 43 on a lower end. The handling arm 35 is also mounted on the pivot pin 42. In this way, the handling arm 35 forms an adjustment lever for the adjustment device 30.

The handle 40 also comprises a second positioning element 41 which here takes the form of a pin, for example a screw shaft. The pin 41 extends transversely to the general orientation of the handle 40.

The lug 43 has a notch 44 on its lower side. The notch 44 is designed to cooperate with the stop 45 of the wheel arm 36.

The first positioning element 32 is here a small cross-shaped plate. Positioning means 51, 52, 53, 54 and 55, which in this case are drilling holes, are arranged in the wall of the plate 32 (FIGS. 2 and 3). The drilling holes 51 to 55 are here positioned in a circular arc, in a single row. The drilling holes 51 to 55 are in this case through-openings, non-restrictively.

The second positioning element 41 is configured to cooperate by matching the shape of the positioning means 51 to 55. In this case, the pin 41 is housed in a drilling hole 51, 52, 53, 54 or 55 based on the desired setting for the tamping device 29. As shown, the drilling holes 51 to 55 can have an oblong shape to allow slight play of the pin 41 designed to be housed therein.

Fastening elements 56, here screws, shown abutting the plate 32, are provided and designed to fasten the plate 32 non-restrictively to the rear leg 20 of the chassis 19.

The axis 420 of the pivot pin 42 forms a common axis of rotation for the handling arm 35, the wheel arms 36 and, here, the torque tube 37.

The role of the flexible connecting element 37 is to exert a positive force (ballast force) or negative force (load-relieving force) on the tamping element 33, i.e. in this case on the wheel arms 36 and the tamping wheel 330.

In the embodiment shown, the positioning means 51 to 55 are positioned so as to provide the adjustment device 30 with several work positions: a neutral position, two reinforced tamping positions, a retracted position, and a load-relieving position. FIGS. 6 to 8 show diagrammatically, non-restrictively, these various working positions that correspond to different settings which the adjustment device 30 can allow. For the sake of simplicity, the only forces shown in FIGS. 6 to 8 and described below are the forces acting on the tamping pressure on the seeds, and more specifically only the vertical components of these forces. Also for the sake of simplicity, the point of application of these forces is shown as belonging to the hub 332 of the tamping wheel 330 (FIG. 6), it being understood that in reality it does not form the centre of gravity of the tamping element 33.

To change the setting of the adjustment device 30, the pin 41 is extracted from the positioning means 51, 52, 53, 54 or 55 in which it is engaged, and then engaged in another positioning means 51, 52, 53, 54 or 55. The handling arm 35 is configured to have sufficient flexibility to allow the disengagement and re-engagement of the first and second positioning elements 32 and 41 relative to each other.

In the neutral tamping position, or more simply in the neutral position (FIG. 7), the flexible connecting element 37 exerts no stress on the wheel arms 36. Only the weight P of the tamping element 33 acts on the seeds in the furrow. The pin 41 is housed in a corresponding drilling hole, in this case the third drilling hole 53, positioned between the drilling holes 51 and 55 located at the opposite ends of the plate 32. The resulting tamping force $F_{RN}$, in the neutral position, is therefore substantially equal to the weight P of the tamping element 33.

In the reinforced tamping positions, the flexible connecting element 37 exerts a ballast stress $F_L$ on the wheel arms 36. The pin 41 is in this case housed in either one of the drilling holes 51 and 52 located furthest forward relative to the chassis 19. In the example shown in FIG. 8, the pin 41 is housed in the drilling hole 52. The flexible connecting element 37 is placed under stress by the pin 41 being embedded in the corresponding drilling hole. The flexible connecting element 37 therefore tends to push the tamping wheel 330 downwards, i.e. towards the bottom of the furrow 4. The tamping stress $F_{RL}$ exerted on the tamping element 33 as a result of ballasting is therefore greater than the own weight P of the tamping element 33.

In retracted position (not shown), the lug 43 is abutted against the stop 45 and the tamping wheel 330 is raised. The wheel 330 is kept at a distance from the bottom of the furrow 4 by the engagement of the pin 41 in the drilling hole 55 (which in this case is the furthest to the rear relative to the chassis 19).

Lastly, in load-relieving position (FIG. 6), the flexible connecting element 37 exerts a load-relieving stress $F_D$ on the wheel arms 36, i.e. on the tamping element 33. The load-relieving stress $F_D$ counters the weight of the tamping element 33. The tamping stress $F_{RD}$ resulting from load-relieving is therefore less than the sole weight P of the tamping element 33. In the example shown, the pin 41 is therefore housed in the fourth drilling hole 54, i.e. the one between the drilling hole 53 (neutral position) and the drilling hole 55 (retracted position). This load-relieving position offers an especially advantageous solution in certain humidity conditions and for certain soils. It is typically implemented in situations where seeds need to be tamped to promote the seeds' contact with the bottom of the furrow and optimise their germination, but the soil is very wet or the soil is so sticky that, in the neutral tamping position, this causes the soil and seeds to stick to the tamping element 33, adversely affecting the planting of the seeds in the furrow 4.

The number of positioning means 51 to 55 is not limited to five. In variants not shown, three, four, six, seven or more positioning means can be provided. In these variants, one of these positioning means also provides a load-relieving position for the tamping element 33.

The features of the various positions and the number of positions can be adapted by sizing the first and second positioning elements. The tamping device 29 can, for example, have a single reinforced tamping position, or more than two reinforced tamping positions—for example three, four, or more—by providing a corresponding number of positioning means (one, three, four or more). Similarly, the tamping device 29 can also have one, three, four or more load-relieving positions. Preferably, the tamping device 29 has at least one load-relieving position and also at least one of either a neutral tamping position or a reinforced tamping position.

In a variant not shown, the flexible connecting element 37 can be replaced (or supplemented) by:
- a torsion spring mounted around the axis 420,
- a helical tension spring; one end of the tension spring is then positioned on the handling arm 35, on the side of the handle 40 relative to the pivot pin 42, and one portion pivoting around the pivot pin 42, i.e. not rolling, of the tamping element 33, like a wheel arm 36; in an advantageous variant, a spring with non-contiguous turns will make it possible to provide at least one load-relieving position and also at least one ballast position;
- a helical compression spring; one end of the compression spring is then positioned on the handling arm 35, on the side opposite to the handle 40 relative to the pivot pin 42, and one portion of the tamping element 33 opposite the surface designed to be in contact with the ground relative to the pivot pin 42, for example the end of the wheel arm 36 carrying the stop.

In another variant not shown, the first positioning element and the second positioning element are configured differently from the elements 32 and 41 described above. The positioning means 51, 52, 53, 54 and 55 are, for example, protruding elements, such as pins, while the second positioning element can be a drilling hole, through or not, formed in the handling arm 35.

In a variant not shown, the first positioning element has a different shape to the one described above and illustrated. The first positioning element is, for example, made in one part with the rear portion 20 of the chassis 19. The positioning means can therefore be carried out in a projection or in a hollow in the mass of the rear portion 20.

In general, the first positioning element 32 is in this case arranged on the chassis 19 and the second positioning element 41 is arranged on the handling arm 35. In this paragraph, the term "arranged" must be understood including both the variants in which the respective positioning element is positioned and fixed against—or relative to—the corresponding portion of the seeder element 5 (for example, the first positioning element 32 fixed on the chassis 19), and the variants in which the respective positioning element is made in one part with the corresponding portion of the seeder element 5.

In a variant not shown, there is no retraction stop 45. The disassembly of the tamping device 29 can therefore be required or the flexible connecting element 37 performs the retraction of the tamping element 33, in a state of extreme compression of the flexible connecting element 37 (respectively a state of extreme elongation in the case of a tension spring).

Combinations of the variants described above are conceivable, for example with regard to the number of positioning means, the shape taken by the first positioning element and the flexible connecting element.

In a variant not shown, the tamping element 33 comprises or consists of a tamping strip. The tamping strip can then replace the tamping wheel 330 and the wheel arm(s) 36.

In another variant not shown, the tamping element 33 extends towards the rear such that the wheel is pulled by the chassis 19 rather than pushed.

In the seeder element 5 described above, comprising a tamping device 29 providing a load-relieving position, the seeds can be transported from the distribution element 33 towards the furrow by air pressure or gravity.

In a variant not shown, the tamping element 33 can comprise a deformable mechanism. This deformable mechanism is, for example, a deformable parallelogram. Such a deformable parallelogram then comprises four pivot pins: two pivot pins on the side of the parallelogram's attachment to the chassis 19 and two pivot pins on the side opposite the attachment. The deformable mechanism can carry a tamping means designed to be in contact with the bottom of the furrow 4, as described above (tamping wheel or tamping strip). The tamping wheel can therein be pivotably mounted, either directly on a lower pivot pin of the deformable mechanism, or on a part rigidly fastened to the two pivot pins opposite the attachment. The tamping strip can also be mounted on a part rigidly fastened to the two pivot pins opposite the attachment, or rigidly fastened to the two lower pivot pins. A tensioning mechanism between the lower and upper arms of the parallelogram is preferably provided.

The invention claimed is:

1. A seeder element for agricultural machines, comprising:
   a seed distribution element and a tamping device, the tamping device being positioned behind an outlet of the seed distribution element in a direction of advance at work of the seeder element,
   the tamping device comprising an adjustment device and a tamping element, the tamping element being configured to exert a tamping force on the ground in at least one work position of the adjustment device,
   wherein the seed distribution element includes furrow opening discs configured to form a furrow,
   wherein the tamping element includes a tamping wheel positioned to move at the bottom of the furrow, and
   wherein the at least one work position of the adjustment device is a load-relieving position in which the adjustment device exerts, on the tamping element, a load-relieving stress that counters a weight of the tamping element.

2. The seeder element according to claim 1, wherein the adjustment device comprises a flexible connecting element, the flexible connecting element exerting the load-relieving stress on the tamping element in the load-relieving position.

3. The seeder element according to claim 2, wherein the adjustment device comprises a handling arm, the position of the handling arm determining the load-relieving stress that the flexible connecting element exerts on the tamping element in the load-relieving position.

4. The seeder element according to claim 3, wherein the adjustment device comprises at least one first positioning element and at least one second positioning element designed to match a shape of the first positioning element, the first positioning element and the second positioning element being configured to be held against each other in the load-relieving position of the tamping device.

5. The seeder element according to claim 4, wherein the seeder element comprises a chassis, the first positioning element being arranged on the chassis and the second positioning element being arranged on the handling arm.

6. The seeder element according to claim 4, wherein the first positioning element comprises at least one drilling hole, the second positioning element comprising at least one pin, a shape of the pin matching that of the at least one drilling hole.

7. The seeder element according to claim 2, wherein the flexible connecting element comprises a torque tube, a tension spring, a compression spring, or a torsion spring.

8. The seeder element according to claim 2, wherein the adjustment device is configured to admit several work positions, one of the work positions being said load-relieving position.

9. The seeder element according to claim 8, wherein the adjustment device is configured to admit a reinforced tamping position in which at least one reinforced tamping force of the tamping element results from application of a vertical stress on the tamping element by the flexible connecting element, and/or the adjustment device admits a neutral tamping position in which a neutral tamping force of the tamping element results exclusively from the weight of the tamping element.

10. The seeder element according to claim 8, wherein the adjustment device is configured to admit a retracted position in which the tamping element is configured to be off the ground.

11. A seeder comprising:
the seeder element according to claim 1.

* * * * *